June 14, 1960
R. V. GOODNER
2,940,787
ELECTRICALLY INSULATED SUCKER ROD COUPLING
Filed Aug. 25, 1958
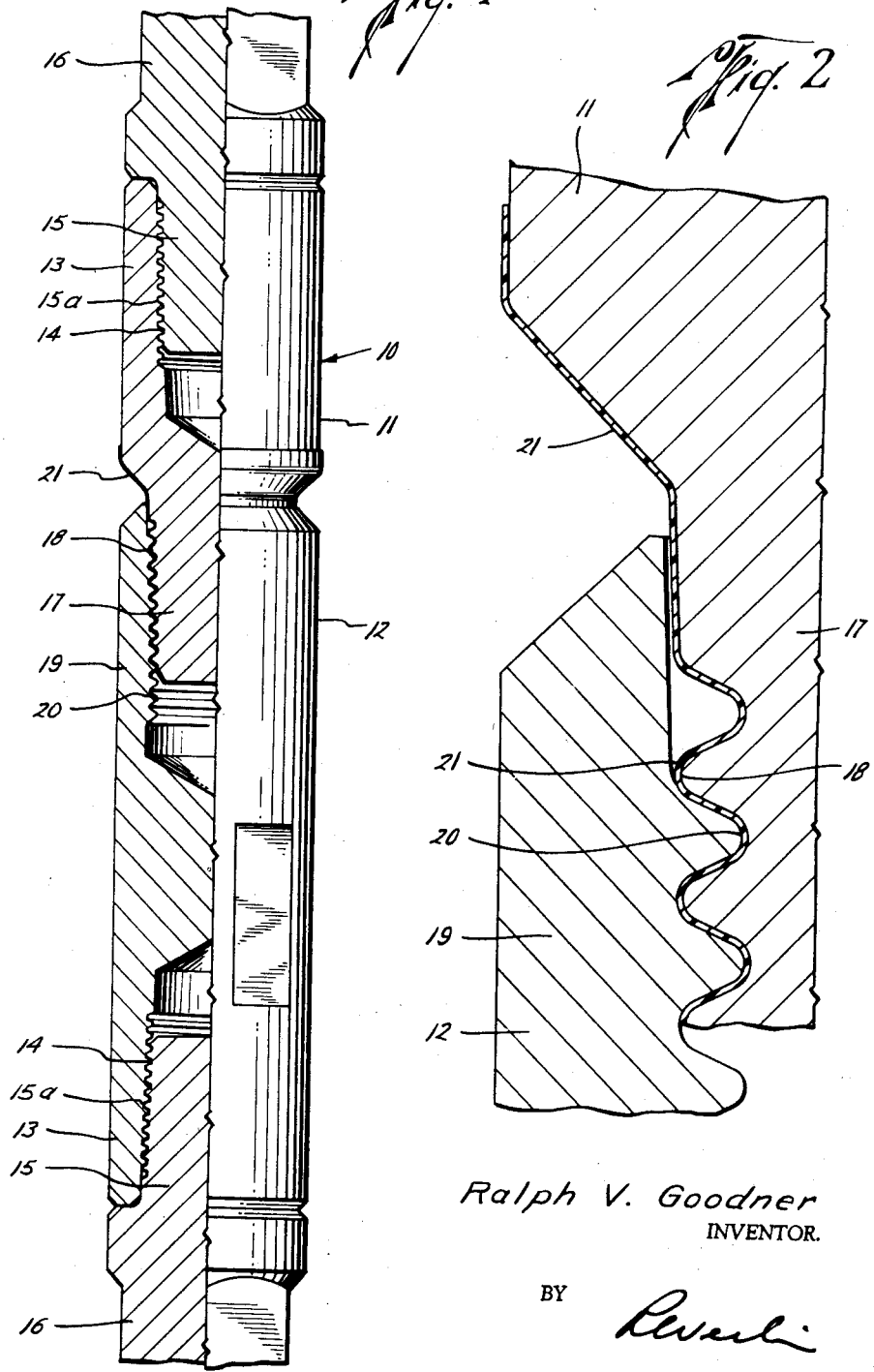
Ralph V. Goodner
INVENTOR.
BY
ATTORNEY

United States Patent Office 2,940,787
Patented June 14, 1960

2,940,787

ELECTRICALLY INSULATED SUCKER ROD COUPLING

Ralph V. Goodner, 4842 Winfree St., Houston, Tex.

Filed Aug. 25, 1958, Ser. No. 756,977

3 Claims. (Cl. 287—125)

This invention relates to sucker rod couplings for use in well pump strings, and more particularly to couplings which are electrically insulated for preventing or inhibiting electrolytic corrosion.

Strings of sucker rods are commonly employed for reciprocating pump plungers in wells for producing oil therefrom. It is known that when wells produce fluid containing electrolytic and corrosive elements, such as salts, sulphur dioxide and hydrogen sulfide, the rods are frequently of relative short life and are consistently subject to failure. When such elements are present in the well fluids, electrolytic corrosive action takes place at the more vulnerable areas, such as the joints, and particularly the threads thereof.

As a result, particularly of the electrolytic action, the threaded joints, in many cases, will give way in very short periods of time, even as little as a few weeks, and as a result, damage to the well and replacement of the rod strings, lost production from the well, and the expense connected therewith become very considerable items in the economy of the operation of the well.

Heretofore various means have been employed in an effort to combat the electrolytic action on rod strings, such as coating the exterior of the entire string with an insulating coating. Such an arrangement is obviously both expensive and is more often quite ineffective, because the rubbing of the rods against the tubing walls will wear through or break the external insulating coating so as to render it ineffective as an insulator. In other arrangements, insulating coatings have been employed between the threads joining the sucker rod sections to couplings and this, too, has proven impractical, usually because there is a degree of movement or rocking between the sucker rod threads and the coupling threads during reciprocation of the rod string and the vibrations thereof, which tends to break the insulating coating. Also, the standard types of threads normally employed for these couplings have sharp corners which, when made up, will cut through the insulating coating and destroy its effectiveness.

The present invention has for its principal object the provision of an improved type of sucker rod coupling which avoids all the difficulties and disadvantages of prior designs, and which has proven exceptionally effective in preventing electrolytic action on the rod strings.

In accordance with this invention, the coupling comprises a two-part body having a threaded joint between the parts, the threads of this joint being of a rounded relatively coarse configuration and covered with a coating material having high dielectric strength.

By providing a two-part coupling having threads which are both coarser, that is, having a lesser number of threads per inch, than the threads in the ends of the coupling to which the rod sections are connected and which are rounded, as contrasted with the usual V-shaped or truncated V-shaped threads commonly employed in rod couplings, there is provided an assemblage in which the body sections of the coupling may be made up to greater reverse torque resistance than the end threads, so that any movement in the threads will tend to occur preferentially in the end threads. Moreover, by reason of the rounded form of the threads, the insulating coating will be more uniformly spread over a greater thread area and the absence of sharp corners will prevent cutting through the insulation when the coupling sections are made up.

In standard sucker rod couplings, which are normally constructed to API standards (American Petroleum Institute) for the thread form and dimensions, the box and pin threads of the coupling are normally ten threads per inch, and the threads are of a cropped or truncated V-form. The present invention employs these same types of threads for the ends forming the connections to the rod sections. In contrast, however, the thread employed in accordance with this invention to connect the two body sections of the coupling will preferably be any suitable type of rounded thread, examples of which are the American Round Standard and British Standard threads, including British Whitworth threads, and will preferably have 6 to 8 threads per inch. Such threads are typified by having their crests and roots machined to curves of definite radii which merge smoothly with the thread flanks.

The insulating material which is employed between the threads connecting the body sections of the coupling may be any suitable material of suitably high dielectric strength. By employing the rounded threads this material can be kept in place and maintained as an unbroken coating between the threads and the other surfaces of the joint.

The various other objects and advantages of the present invention will become more fully apparent from the following detailed description when read in conjunction with the accompanying drawing.

In the drawing:

Fig. 1 is a quarter-sectional view of a sucker rod coupling in accordance with this invention, showing the coupling connected between a pair of rod sections; and Fig. 2 is an enlarged fragmentary view, in section, more clearly illustrative of the thread form and insulating coating interposed in the connection between the threaded sections of the rod coupling.

The coupling, in accordance with the present invention, comprises a two-part body, designated generally by the numeral 10, made up of two body sections 11 and 12, which are adapted to be threadedly connected coaxially to form body 10. At their outer ends, body sections 11 and 12 are each provided with a tapered box or socket 13 provided with internal threads 14, which may be of any standard thread form commonly employed for sucker rod couplings. As indicated, these threads will ordinarily be 10 threads per inch (t.p.i.) standard API threads. Sockets 13 are adapted to receive the externally threaded tapered pin members 15 carried by the ends of rod sections 16, the pin threads 15a being of the same form as threads 14. It will be understood, of course, that instead of having female-type connections at the ends of body 10, these connections may be male or pin members at both ends, or the body may be provided with a socket at one end and a pin at the other, all of these arrangements being conventional in the rod coupling art, although the commonest arrangement is that illustrated, namely, the sockets at both ends of the coupling.

Body section 11 is reduced in diameter at the end opposite box 13 to provide a tapered pin or male member 17 which is provided with external threads 18, which are of a suitable rounded form, as previously mentioned, and which will be coarser than the threads employed in sockets 13. Preferably the number of threads per inch on pin 17 will be 8, but a 6 or 7 thread per inch joint will also be found practical in some instances. It is particularly important to note that pin member 17 should be constructed to have fewer threads per inch than the sockets 13. Body section 12 is provided, at the end opposite socket 13, with an internally threaded box or socket 19 carrying internally threads 20 complemneting threads 18 on pin member 17. These threads 20 will be of the rounded form and lesser in number per inch than the threads on end sockets 13. All the threads in the ends of the body and between the body sections are turned so as to make up by rotation in the same direction and may either be all right-hand or all left-hand threads.

An insulating coating 21 is applied between pin 17 and socket 19 and extends from a point on pin 17 outside the end of socket 19 throughout the length of the engaged threads between pin 17 and socket 19, and covers the end of the pin. So much of the pin surface will be covered as will assure against electrical contact between the engaged surfaces of pin 17 and socket 19.

This insulating coating may be any one of the well-known and numerous plastic or resinous materials which are commercially avaliable, which have high dielectric strength and which are preferably of a tough and flexible character adapted to adhere tightly to the thread surfaces so as to remain in place between threads. Among the many types of coating which can be employed are those commonly classified as epoxies, phenolics, rubber compositons, and alkyds, and various combinations of these and others.

In many instances, a coating is preferred which is of a thermo-setting type which may be applied in liquid form to the surfaces of pin 17 and threads 18 and made up in socket 19. The joint will then be subjected to sufficient heat to cause the coating to harden or set and cause it to be securely adhered to the surfaces to which it is applied.

By applying the coating in liquid form to the pin threads and connecting the pin in the box or socket, the coating will be spread uniformly and in a thin layer over the thread surfaces as the joint is made up, particularly in view of the rounded character of the preferred thread forms, as described.

Also, as noted, the absence of sharp corners in the thread form employed in accordance with this invention, will assure that the threads will not cut through the coating material as the joint is made up, but will assure a thin but highly effective insulating coating between the threads.

By making the threads both rounded and coarser or fewer in number per inch than the end connection threads, the connection between body sections 11 and 12 can be made up to a degree of tightness having a substantially greater resistance to unscrewing than the threads in the sockets 13; for example, the threads 18 and 20 may be made up to resist a reverse torque greater than 300 foot-pounds, as compared with reverse torque resistance of 50 foot-pounds to which the end threads will ordinarily be made up.

Another advantage arising from the use of the coarser rounded thread for connecting the coupling sections to each other is that such threads will provide the maximum amount of thread surface contact, thereby providing increased tensile strength in this connection, and will also provide larger area for the insulating coating.

An illustrative example of the procedure for coating and making up the connection between the coupling sections is to apply to the surface of pin 17 and threads 18 an epoxy phenolic resin of suitable character in liquid form. The coated member is then made up in socket 19 to the degree necessary to provide the desired resistance to unscrewing torque, and the joint is then subjected to heating at temperatures of 400° to 500° F., in order to cause the resin to harden and set tightly on and between the thread and joint surfaces. This particular material has a dielectric strength of 1000 volts per mil of coating thickness, and when set, has a substantial degree of toughness and flexibility which will resist fracture and scaling even under severe vibratory conditions.

A rod coupling made up in the manner described, is found to possess such insulating effectvieness when installed in the rod string as to practically preclude all electrolytic corrosion. In practice, insulating couplings, constructed as herein described, are preferably installed in the rod string at intervals of not more than 200 feet, although the spacing will obviously be dependent on the conditions under which the particular rod string is required to operate.

As one example of the insulating effectiveness of the couplings constructed in accordance with this invention, they were installed in a rod string, which previously had suffered breaks on the average of once each week. The expense and econmic losses of such a condition is obvious. Following installation of couplings constructed in accordance with this invention in the rod string in the same well, no breaks have occurred after 12 weeks, and all indications are that no corrosion of any material character has occurred.

It will be evident that the principles of the present invention may be employed for insulating the threaded joints between pipes, or other threaded strings which are subject to electrolytic corrosion.

It will be understood that alterations and changes may be made in the details of the illustrative embodiment within the scope of the appended claims, but without departing from the spirit of this invention.

What I claim and desire to secure by Letters Patent is:

1. A sucker rod coupling comprising a coupling body, first threaded means disposed at the opposite ends of said body for connecting said body coaxially with sucker rod ends, said body comprising two separable co-axial body sections, second threaded means for connecting said body sections together, said second threaded means comprising a male threaded element mounted on one of said sections and a female threaded element mounted on the other of said sections, said male and female threaded elements having closely corresponding threads characterized by smoothly rounded roots and crests, means to prevent electrical contact between said sections comprising a thin layer of a dielectric material interposed between said male and female threaded elements, each of said first and second threaded means being engageable and disengageable by rotation about the axis of said coupling body, said male and female threaded elements frictionally retaining each other through the medium of said dielectric material to require a greater torque to effect relative rotational movement therebetween than first threaded means.

2. A sucker rod coupling as recited in claim 1 wherein said first and second threaded means are constructed for engagement and disengagement by rotation in the same direction.

3. A sucker rod coupling as recited in claim 1 wherein said second threaded means comprises fewer threads per unit length than said first threaded means.

References Cited in the file of this patent

UNITED STATES PATENTS

| | | |
|---|---|---|
| 138,277 | Peet | Apr. 29, 1873 |
| 1,497,952 | Smith | June 17, 1924 |
| 1,559,874 | Holland | Nov. 3, 1925 |
| 1,619,728 | Hopkins | Mar. 1, 1927 |
| 1,859,311 | McEvoy | May 24, 1932 |
| 2,049,289 | Burns et al. | July 28, 1936 |
| 2,161,568 | Gignoux | June 6, 1939 |
| 2,286,829 | Reid | June 16, 1942 |
| 2,437,843 | Van Ness | Mar. 16, 1948 |

FOREIGN PATENTS

| | | |
|---|---|---|
| 48,420 | Norway | Sept. 15, 1930 |